(12) United States Patent
Kikuchi et al.

(10) Patent No.: US 9,868,169 B2
(45) Date of Patent: Jan. 16, 2018

(54) GEAR-CUTTING MACHINE

(71) Applicant: MITSUBISHI HEAVY INDUSTRIES MACHINE TOOL CO., LTD., Ritto-shi, Shiga (JP)

(72) Inventors: Toshimasa Kikuchi, Tokyo (JP); Kazutaka Maruyama, Tokyo (JP)

(73) Assignee: MITSUBISHI HEAVY INDUSTRIES MACHINE TOOL CO., LTD., Ritto-shi (JP)

(*) Notice: Subject to any disclaimer, the term of this patent is extended or adjusted under 35 U.S.C. 154(b) by 0 days.

(21) Appl. No.: 14/916,459

(22) PCT Filed: Aug. 22, 2014

(86) PCT No.: PCT/JP2014/071950
§ 371 (c)(1),
(2) Date: Mar. 3, 2016

(87) PCT Pub. No.: WO2015/033799
PCT Pub. Date: Mar. 12, 2015

(65) Prior Publication Data
US 2016/0193676 A1    Jul. 7, 2016

(30) Foreign Application Priority Data
Sep. 6, 2013  (JP) .................................. 2013-184615

(51) Int. Cl.
*B23F 5/18* (2006.01)
*B23F 23/00* (2006.01)
(Continued)

(52) U.S. Cl.
CPC .............. *B23F 23/006* (2013.01); *B23F 5/16* (2013.01); *B23F 1/04* (2013.01); *B23F 5/12* (2013.01);
(Continued)

(58) Field of Classification Search
CPC . Y10T 409/103816; Y10T 409/103975; Y10T 409/104452; Y10T 409/10477;
(Continued)

(56) References Cited

U.S. PATENT DOCUMENTS 3,570,367 A    3/1971 Looman
3,722,359 A    3/1973 Hans et al.
(Continued)

FOREIGN PATENT DOCUMENTS

DE    1752207 A1    5/1971
JP    4-238504 A    8/1922
(Continued)

OTHER PUBLICATIONS

Chinese Office Action dated Nov. 30, 2016 received in corresponding Chinese Application No. 201480048202.1 with an English Translation.
(Continued)

*Primary Examiner* — Daniel Howell
*Assistant Examiner* — Yasir Diab
(74) *Attorney, Agent, or Firm* — Birch, Stewart, Kolasch & Birch, LLP

(57) ABSTRACT

This gear cutting machine, which is equipped with a cutter (15), a cutter spindle motor (11) that causes, via a crank mechanism (13) and a cutter spindle (16), the cutter (15) perform a stroke operation, and a motor control unit (10) that controls the rotation angle of the cutter spindle motor (11), is provided with a relieving spindle motor (12) that causes the cutter (15) to move in the direction of a relieving spindle via a link mechanism (four-joint link mechanism (14)). The motor control unit (10) controls the rotation angle of the relieving spindle motor (12) on the basis of the rotation angle of the cutter spindle motor (11). Consequently, a gear cutting machine that accurately controls the relieving opera-
(Continued)

tion in accordance with a desired shape, such as crowning and tapering of a gear to be cut can be provided.

6 Claims, 16 Drawing Sheets

(51) Int. Cl.
*B23F 5/16* (2006.01)
*B23F 9/04* (2006.01)
*B23F 5/12* (2006.01)
*B23F 9/07* (2006.01)
*B23F 1/04* (2006.01)

(52) U.S. Cl.
CPC . *B23F 5/18* (2013.01); *B23F 9/04* (2013.01); *B23F 9/07* (2013.01); *Y10T 409/10477* (2015.01); *Y10T 409/103975* (2015.01); *Y10T 409/104929* (2015.01); *Y10T 409/105088* (2015.01); *Y10T 409/105247* (2015.01); *Y10T 409/107155* (2015.01); *Y10T 409/109063* (2015.01)

(58) Field of Classification Search
CPC . Y10T 409/104929; Y10T 409/105088; Y10T 409/105247; Y10T 409/105406; Y10T 409/105724; Y10T 409/106519; Y10T 409/107155; Y10T 409/107632; Y10T 409/109063; Y10T 409/109381; B23F 1/04; B23F 5/12; B23F 5/16; B23F 5/18; B23F 9/04; B23F 9/07
See application file for complete search history.

(56) References Cited

U.S. PATENT DOCUMENTS

| | | | | |
|---|---|---|---|---|
| 3,739,686 A | * | 6/1973 | Marano | B23F 19/007 409/32 |
| 4,537,537 A | * | 8/1985 | Becher | B23F 5/16 409/2 |
| 4,587,766 A | * | 5/1986 | Miyatake | B23F 23/006 318/685 |
| 4,606,682 A | * | 8/1986 | Miller | B23F 5/16 409/19 |
| 6,065,910 A | * | 5/2000 | Egawa | B23F 5/16 407/20 |
| 6,905,292 B2 | * | 6/2005 | Schuon | B23F 5/12 409/10 |
| 2002/0081163 A1 | * | 6/2002 | Courtney | B23F 5/12 407/30 |
| 2011/0262239 A1 | | 10/2011 | Tokawa et al. | |
| 2012/0301241 A1 | * | 11/2012 | Maruyama | B23F 1/04 409/38 |

FOREIGN PATENT DOCUMENTS

| | | |
|---|---|---|
| JP | 59-53120 A | 3/1984 |
| JP | 2004-154921 A | 6/2004 |
| JP | 2009-83295 A | 4/2009 |
| JP | 2010-131729 A | 6/2010 |
| SU | 1641534 A1 | 4/1991 |
| TW | I233847 B | 6/2005 |
| WO | WO 2008/001835 A1 | 1/2008 |
| WO | WO 2010/067690 A1 | 6/2010 |

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2014/071950, dated Mar. 17, 2016.
International Search Report and Written Opinion of the International Searching Authority (Forms PCT/ISA/210, PCT/ISA/220 and PCT/ISA/237) for International Application No. PCT/JP2014/071950, dated Nov. 18, 2014, with an English translation of the International Search Report.
Japanese Office Action for Japanese Application No. 2013-184615, dated Jul. 15, 2014, with an English translation.
Office Action dated Oct. 27, 2016 issued in corresponding Taiwanese Application No. 103130291 with an English Translation.

* cited by examiner

Fig.1(a)
Fig.1(b)
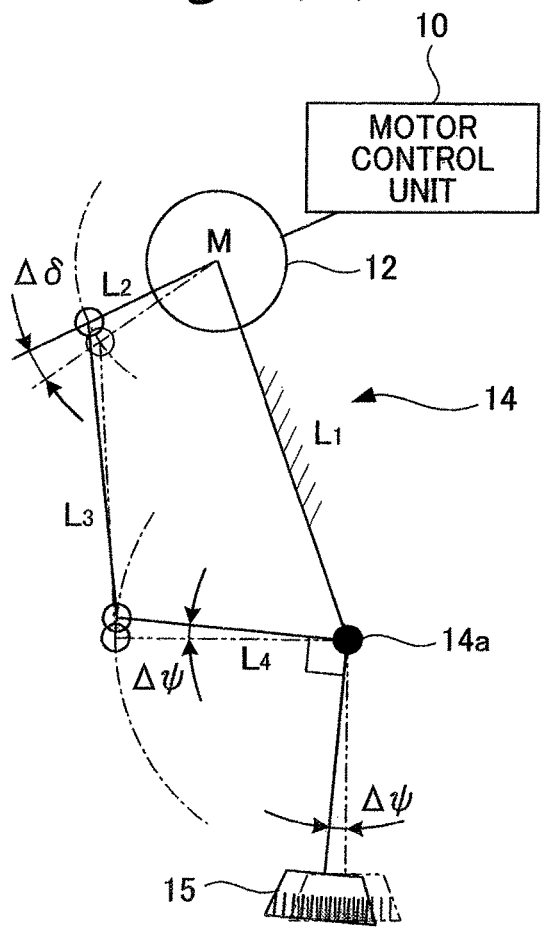
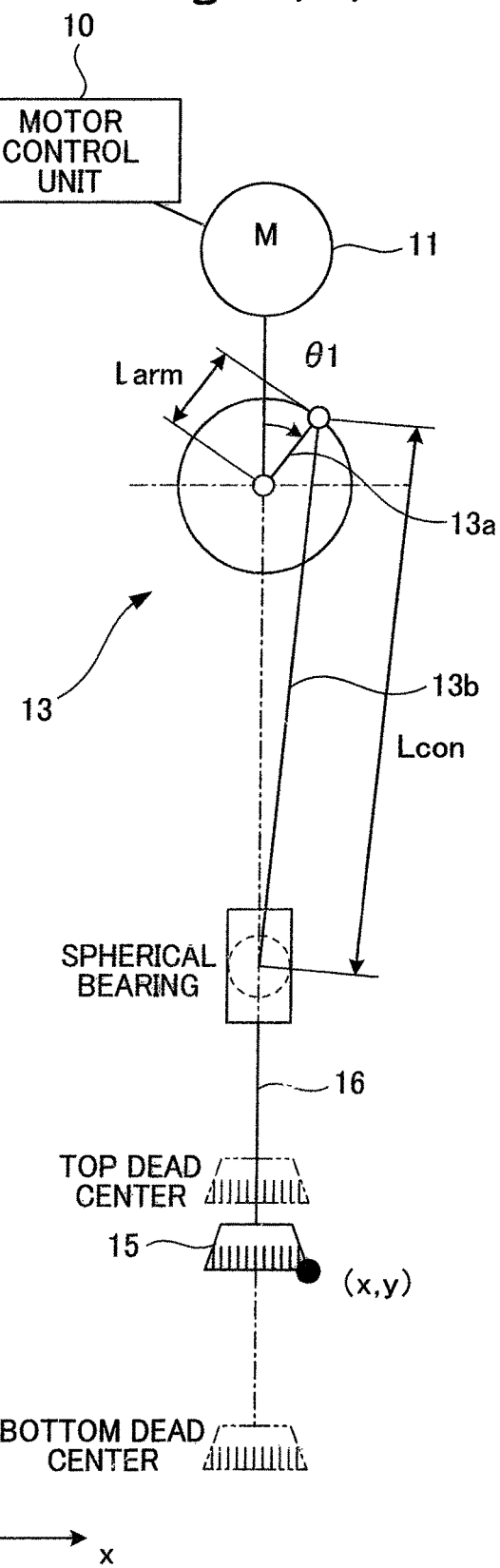

Related Art

TAPERING AMOUNT

GEAR-CUTTING MACHINE

TECHNICAL FIELD

The present invention relates to a gear cutting machine.

BACKGROUND ART

In conventional gear cutting machines, principally, gear shapers, a cutter spindle motor causes a tool to perform a stroke operation (linear reciprocal movement) in a vertical direction of the tool (in a spindle direction). In addition, in synchronism with this cutter spindle motor, a cam mechanism causes the tool to move toward or away from a gear to be cut in a direction orthogonal to the cutter spindle, that is, to perform a relieving operation.

FIG. 13 is a schematic view for explaining a cam mechanism of a conventional gear cutting machine. As shown in this figure, the conventional gear cutting machine has a cam 101 linked to a cutter spindle motor with a gear train (the illustration is omitted) and configured to rotate mechanically and synchronously. Together with the rotation of the cam 101, a cam lever 102 moves, and the movement of the cam lever 102 via a four-bar link mechanism 104 provided to the cam lever 102 causes a cutter 105 to perform the relieving operation.

FIG. 14 is a schematic diagram for explaining a path of the cutter in the conventional gear cutting machine, and the solid arrow in this figure indicates the path of the cutter. As shown in this figure, the cutter 105 in the conventional gear cutting machine performs machining in a cutting step (top dead center→bottom dead center), and performs a relieving operation in a returning step (bottom dead center top dead center) so that the cutter 105 can avoid interfering with a gear 21 to be cut in the returning step.

PRIOR ART DOCUMENT

Patent Document

Patent Document 1: Japanese Patent Application Publication No. 2004-154921

SUMMARY OF THE INVENTION

Problems to be Solved by the Invention

Since the relieving operation of the cutter in the conventional gear cutting machine is determined in accordance with the shape of the cam, the cutter follows the same path. Hence, the relieving operation cannot be performed suitably in a crowning process and a tapering process to be described later. Moreover, it is not easy to replace the cam.

Patent Document 1 discloses, instead of having a cutter spindle motor mechanically generating a driving force required for relieving, a technique of providing a relieving spindle motor independent from the cutter spindle motor: a type of gear cutting machine which performs an NC control on a relieving operation. In this gear cutting machine, the relieving operation is utilized not only for preventing an interference between a cutter and a gear to be cut in a returning step, but also for a crowning process and a tapering process in a cutting step.

FIG. 15 is a diagram for explaining the crowning process in the type of gear cutting machine which performs an NC control on a relieving operation, Part (a) thereof shows a schematic diagram for explaining a path of the cutter during the crowning process, and Part (b) thereof shows a perspective view of the crowned gear to be cut. Note that, in this figure, the solid arrow in Part (a) indicates the path of the cutter, and the long and short dash lines in Part (b) indicate the shape of a gear to be cut not having been subjected to the crowning process.

As shown in Part (a) of FIG. 15, in the cutting step, the cutter 105 is caused to perform the relieving operation on an arc-shaped path. This makes it possible to perform the crowning process on a gear 21 to be cut as shown in Part (b) of FIG. 15.

FIG. 16 is a diagram for explaining the tapering process in the type of gear cutting machine which performs an NC control on a relieving operation, Part (a) thereof shows a schematic diagram for explaining a path of the cutter during the tapering process, and Part (b) thereof shows a perspective view of the tapered gear to be cut. Note that, in this figure, the solid arrow in Part (a) indicates the path of the cutter, and long and short dash lines in Part (b) indicate a tapering amount.

As shown in Part (a) of FIG. 16, in the cutting step, the cutter 105 is caused to perform the relieving operation on an inclined path. This makes it possible to perform the tapering process on the gear 21 to be cut as shown in Part (b) of FIG. 16.

However, since Patent Document 1 does not describe how the relieving spindle motor is controlled, the method for accurately controlling the relieving operation in accordance with a desired shape of a gear to be cut is not clear.

Accordingly, an object of the present invention is to provide a gear cutting machine which accurately controls a relieving operation in accordance with a desired shape of a gear to be cut.

Means for Solving the Problems

A gear cutting machine according to a first aspect of the invention to achieve the above object is a gear cutting machine comprising:

a cutter;

a cutter spindle motor configured to cause, via a crank mechanism and a cutter spindle, the cutter to perform a stroke operation in a direction of the cutter spindle; and a motor control unit configured to control a rotation angle of the cutter spindle motor, characterized in that the gear cutting machine comprises a relieving spindle motor configured to cause the cutter to move in a direction of a relieving spindle via a link mechanism, and the motor control unit controls a rotation angle of the relieving spindle motor based on the rotation angle of the cutter spindle motor.

A gear cutting machine according to a second aspect of the invention to achieve the above object is the gear cutting machine according to the first aspect of the invention, characterized in that the motor control unit determines a track of the cutter on x-y coordinates from tracks of the cutter on x-θ coordinates and on y-θ coordinates, where θ is the rotation angle of the cutter spindle motor, the y-axis direction is the direction of the cutter spindle, and the x-axis direction is the direction of the relieving spindle, determines an inclination angle of the cutter from the track of the cutter on the x-y coordinates (the inclination angle of the cutter is equal to an inclination angle of a cutter head (the illustration is omitted). The same applies hereinafter), determines an output angle of the link mechanism from the inclination angle, and determines an input angle of the link mechanism from the output angle, so that the motor control unit controls the rotation angle of the relieving spindle motor.

A gear cutting machine according to a third aspect of the invention to achieve the above object is the gear cutting machine according to the second aspect of the invention, characterized in that the motor control unit performs control such that the track of the cutter in a relieving region on the x-θ coordinates forms a universal cam curve.

A gear cutting machine according to a fourth aspect of the invention to achieve the above object is the gear cutting machine according to the second or the third aspect of the invention, characterized in that the motor control unit divides into two sub-zones each of a zone of a machining region and a zone of the relieving region within the θ, and controls the track of the cutter in each of the divided sub-zones on the x-θ coordinates.

Effect of the Invention

The gear cutting machine according to the present invention makes it possible to accurately control a relieving operation in accordance with a desired shape of a gear to be cut. Thus, the relieving operation can be performed suitably in a crowning process and a tapering process, and is also applicable to internal gear cutting.

BRIEF DESCRIPTION OF THE DRAWINGS

FIG. 1 shows schematic views of a gear cutting machine according to Embodiment 1 of the present invention. Part (a) thereof shows a relieving spindle system, and Part (b) thereof shows a cutter spindle system.

MODE FOR CARRYING OUT THE INVENTION

Figure 2:
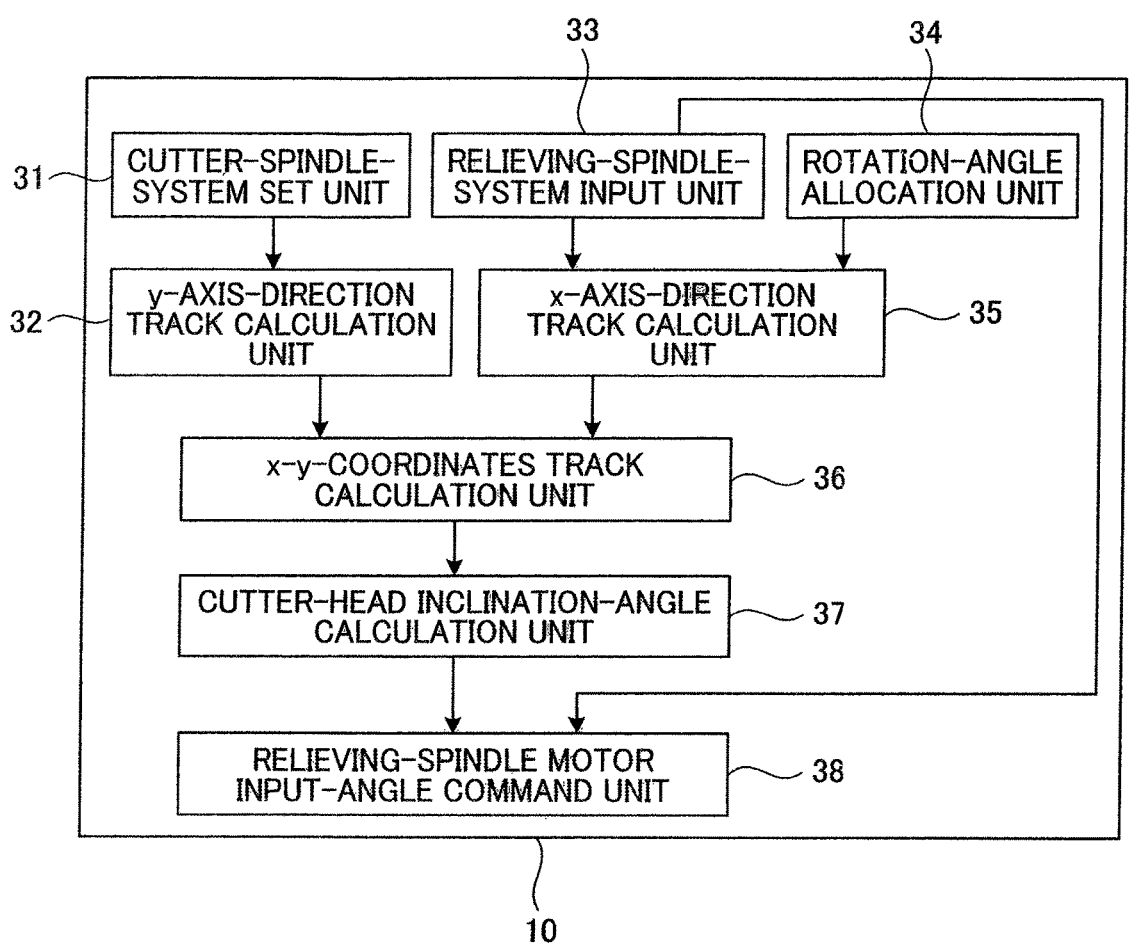
FIG. 2 is a block diagram for explaining a configuration of a motor control unit.

Hereinafter, a gear cutting machine according to the present invention will be described by way of Embodiment using the drawings.

Embodiment

Embodiment 1

A gear cutting machine according to Embodiment 1 of the present invention performs an NC control on a relieving operation. The gear cutting machine according to Embodiment 1 of the present invention will be described using Parts (a) and (b) of FIG. 1.

FIG. 1 shows schematic views of the gear cutting machine according to Embodiment 1 of the present invention, Part (a) thereof shows a relieving spindle system, and Part (b) thereof shows a cutter spindle system. As shown in this figure, the present machine includes a motor control unit 10, a cutter spindle motor 11, a crank mechanism (slider crank mechanism) 13, a relieving spindle motor 12, a four-bar link mechanism 14, a cutter 15, and a cutter spindle 16.

As shown in Part (b) of FIG. 1, the cutter spindle motor 11 is a servomotor configured to cause the cutter 15 to perform a stroke operation in a y-axis direction by transmitting a rotational movement to the cutter 15 via the crank mechanism 13 and the cutter spindle 16. Moreover, the crank mechanism 13 includes a crank arm $13_a$ and a connecting rod $13_b$. Note that the y-axis direction refers to a direction of the cutter spindle. Hereinbelow, a direction of a relieving spindle, which is orthogonal to the direction of the cutter spindle, is an x-axis direction.

As shown in Part (a) of FIG. 1, the relieving spindle motor 12 is a servomotor configured to cause the cutter 15 to perform a relieving operation in the x-axis direction by transmitting a rotational movement to the cutter 15 via the four-bar link mechanism 14. Note that, in Part (a) of FIG. 1, $L_1$, $L_2$, $L_3$, and $L_4$ on the four-bar link mechanism 14 respectively denote lengths of a fixed link, an input link, a coupler link, and an output link. Here, the input link (the link having the length $L_2$) moves together with the rotation of the relieving spindle motor 12.

The motor control unit 10 is configured to control rotation angles (rotational movements) of the cutter spindle motor 11 and the relieving spindle motor 12 independently from each other. Hereinafter, the motor control unit 10 will be described in detail.

FIG. 2 is a block diagram for explaining a configuration of the motor control unit 10. As shown in this figure, the motor control unit 10 includes a cutter-spindle-system set unit 31, a y-axis-direction track calculation unit 32, a relieving-spindle-system input unit 33, a rotation-angle allocation unit 34, an x-axis direction track calculation unit 35, an x-y-coordinates track calculation unit 36, a cutter-head inclination-angle calculation unit 37, and a relieving-spindle-motor input-angle command unit 38.

Figure 14:
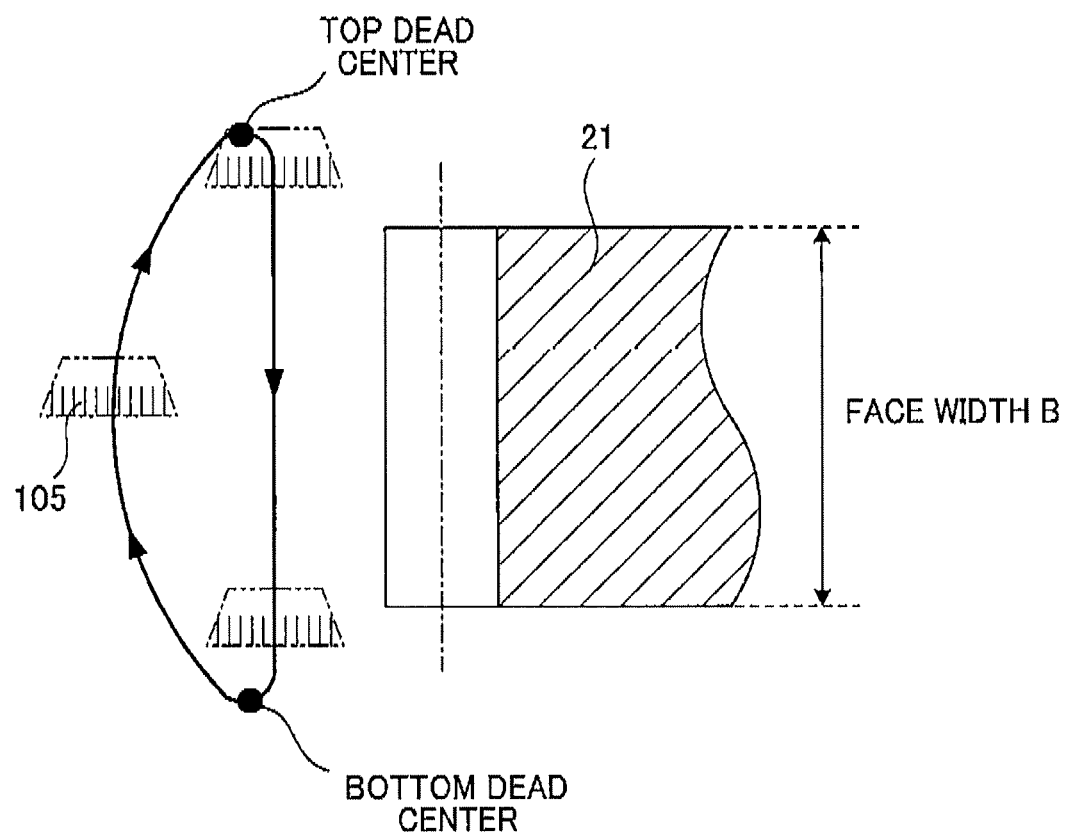
FIG. 14 is a schematic diagram for explaining a path of a cutter in the conventional gear cutting machine.
Figure 15A:
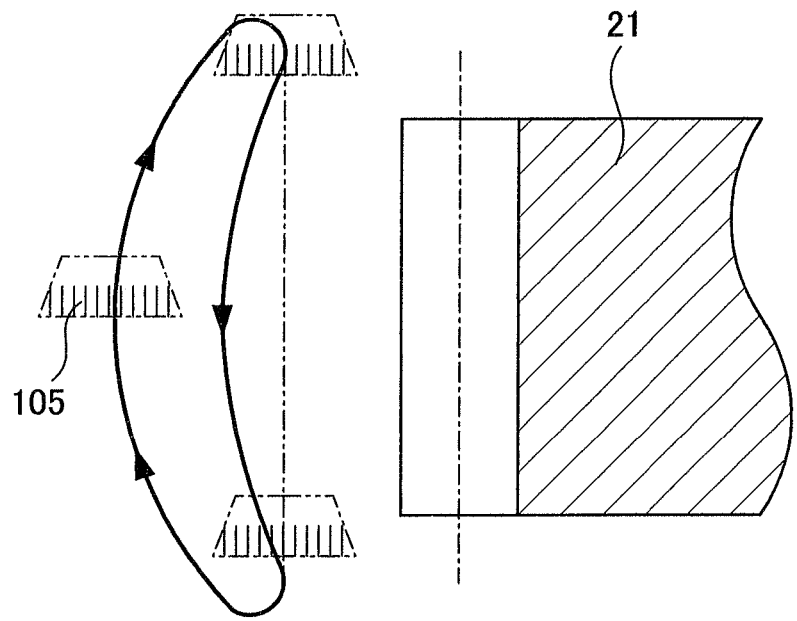
FIG. 15 is a diagram for explaining a crowning process in a type of gear cutting machine which performs an NC control on a relieving operation. Part (a) thereof shows a schematic diagram for explaining a path of a cutter during the crowning process, and Part (b) thereof shows a perspective view of a crowned gear to be cut.
Figure 15B:
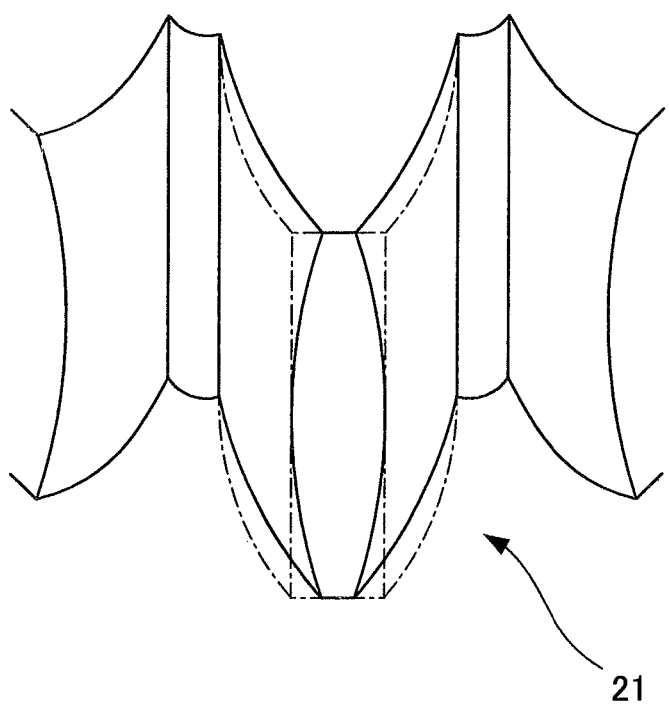
Figure 16A:
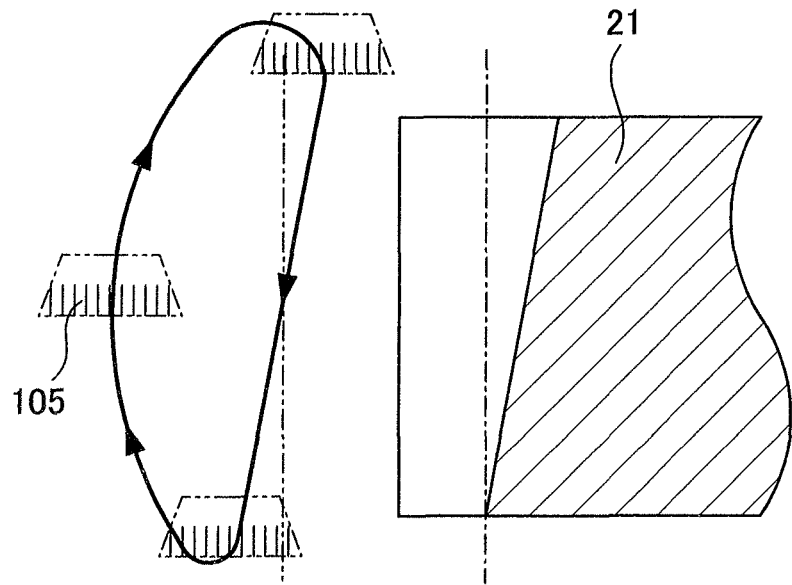
FIG. 16 is a diagram for explaining a tapering process in the type of gear cutting machine which performs an NC control on a relieving operation. Part (a) thereof shows a schematic diagram for explaining a path of the cutter during the tapering process, and Part (b) thereof shows a perspective view of the tapered gear to be cut.
Figure 16B:
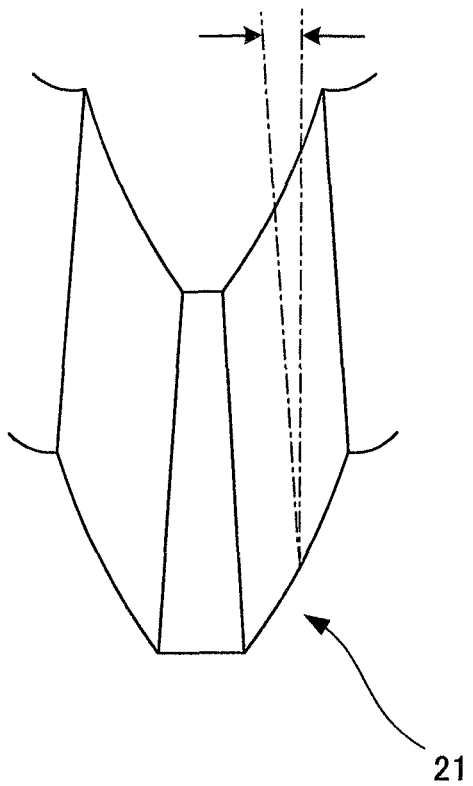

The cutter-spindle-system set unit 31 is configured to receive: a value of a face width B (see FIG. 14) of a gear 21 to be cut; and calculate a length $L_{arm}$ of the crank arm 13$_a$ based on the face width B. Moreover, the cutter-spindle-system set unit 31 is configured to output data on the length $L_{arm}$ of the crank arm 13$_a$ and on a length $L_{con}$ of the connecting rod 13$_b$, which is a machine-specific constant set in advance, to the y-axis-direction track calculation unit 32.

The y-axis-direction track calculation unit 32 is configured to: determine a shift of the cutter 15 in the y-axis direction from a rotation angle θ based on the data inputted from the cutter-spindle-system set unit 31; and control the rotational movement of the cutter spindle motor 11. The phrase determining a shift of the cutter 15 in the y-axis direction from the rotation angle θ means, in other words, determining a track of the cutter 15 on y-θ coordinates.

Figure 4:
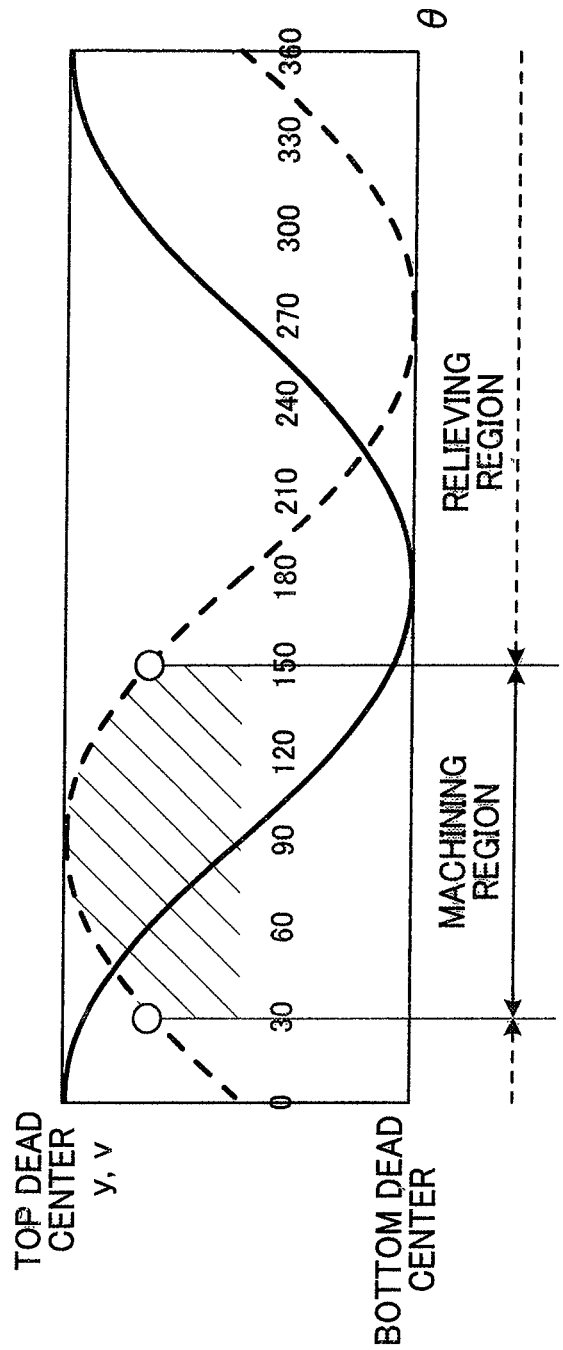
FIG. 4 is a graph for illustrating a track (solid line) and a velocity (broken line) of a cutter, which are plotted on y-θ coordinates and v-θ coordinates.

FIG. 4 is a graph for illustrating the track (and velocity) of the cutter plotted on the y-θ coordinates (and v-θ coordinates). The track of the cutter 15 on the y-θ coordinates, that is, y=f(θ), resembles a cosine curve as indicated by the solid line in the graph. Further, the y-axis-direction track calculation unit 32 is configured to output data on y=f(θ) to the x-y-coordinates track calculation unit 36.

The relieving-spindle-system input unit 33 is configured to: receive data on a relieving amount R, a crowning amount $R_1$, and a tapering amount $R_2$ in accordance with the shape of the gear 21 to be cut; and output the inputted data to the x-axis-direction track calculation unit 35. Incidentally, the relieving amount R may be set to a fixed value in advance. Note that all of R, $R_1$, and $R_2$ are shift amounts in the x-axis direction.

Moreover, the relieving-spindle-system input unit 33 is configured to: receive data on the lengths $L_1$, $L_2$, $L_3$, and $L_4$ of the fixed link, the input link, the coupler link, and the output link of the four-bar link mechanism 14; and output the inputted data to the relieving-spindle-motor input-angle command unit 38.

Figure 5:
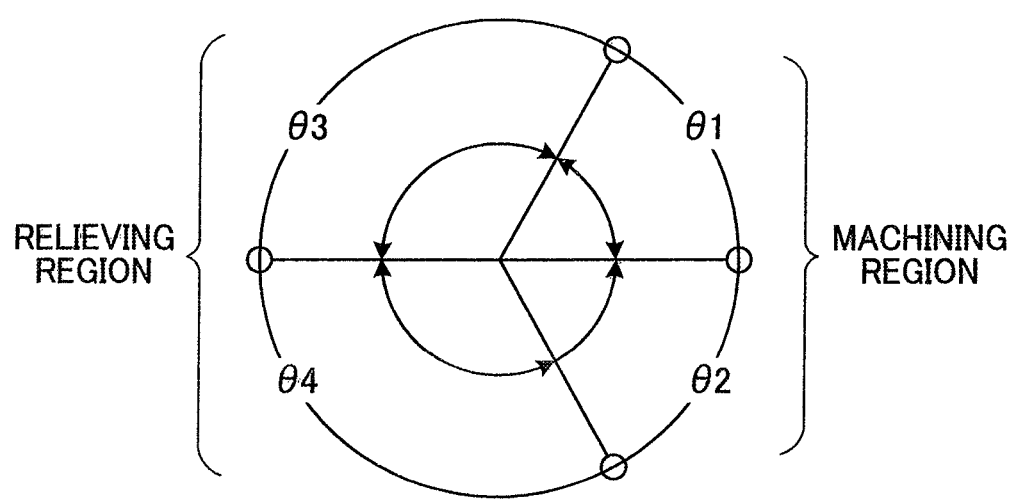
FIG. 5 is a graph for explaining correspondences of a rotation angle θ of a cutter spindle motor in a single rotation thereof with a machining region and a relieving region.

The rotation-angle allocation unit 34 is configured to set correspondences of the rotation angle θ of the cutter spindle motor 11 in a single rotation thereof with a cutting step (machining region) and a returning step (relieving region). As shown in FIG. 5, first, the machining region is divided into two sub-zones to obtain θ1 and θ2 as sub-zones of the rotation angle θ respectively corresponding to the two. Similarly, the relieving region is divided into two sub-zones to obtain θ3 and θ4 as sub-zones of the rotation angle θ respectively corresponding to the two.

Meanwhile, as indicated by the broken line in FIG. 4, a velocity v of the cutter 15 in the y-axis direction in a range of θ=0 to 180 deg. is zero at a top dead center with θ=0 deg. and at a bottom dead center with θ=180 deg., while the velocity v is at its maximum with θ=90 deg. Since the machining efficiency varies in accordance with the velocity v of the cutter 15 in the y-axis direction, the machining efficiency is lowered around the top and bottom dead centers.

Thus, in the present embodiment, 90±60 deg. is the zone of θ corresponding to the machining region (hatched portion in FIG. 4). Additionally, θ=30 to 90 deg. is θ1, and θ=90 to 150 deg. is θ2.

The rotation angles θ3 and θ4 corresponding to the relieving region are ones obtained by subtracting the rotation angles θ1 and θ2 corresponding to the machining region from the rotation angle θ of the cutter spindle motor 11 in the single rotation. Here, θ=150 to 270 deg. is θ4, and θ=270 to 30 deg. is θ3.

Note that, in the above description, the rotation angle θ is set to have four sub-zones in total: θ1 and θ2 in the machining region and θ3 and θ4 in the relieving region. Nevertheless, it is also possible to set, for example, two sub-zones in total: one in the machining region and one in the relieving region.

Furthermore, the rotation-angle allocation unit 34 is configured to output data on the correspondences of the rotation angle θ of the cutter spindle motor 11 in the single rotation with the machining region and the relieving region, which have been set as described above, to the x-axis-direction track calculation unit 35.

The x-axis-direction track calculation unit 35 is configured to perform setting such that a track of the cutter 15 in the relieving region (θ3, θ4) on x-θ coordinates forms a universal cam curve based on the data inputted from the relieving-spindle-system input unit 33 and the rotation-angle allocation unit 34.

Normally, the relieving amount R is large in terms of the shift amount in the x-axis direction in comparison with the crowning amount $R_1$ and the tapering amount $R_2$. Hence, in considering a case of operating the cutter 15 at a high velocity, it is necessary to smoothly link the track of the cutter 15 in the relieving region between an acceleration section and a deceleration section. Accordingly, setting the track of the cutter 15 plotted on the x-θ coordinates to form the universal cam curve makes a smooth and continuous NC control possible.

Figure 6:
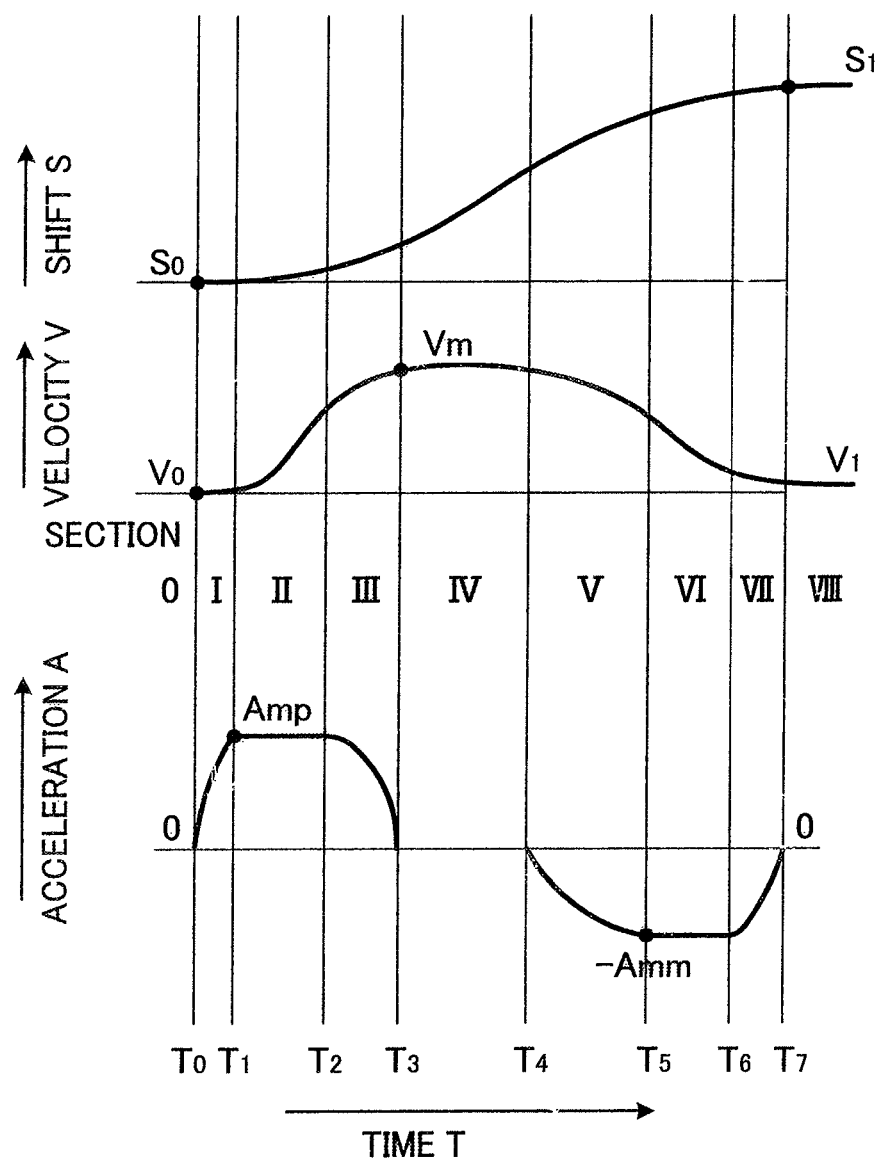
FIG. 6 is a graph for illustrating an example of a universal cam curve.

The universal cam curve includes various curves as shown in Table 1 below. As exemplified in FIG. 6, curves of a shift S, a velocity V, and an acceleration A can be defined against time T in accordance with specific parameters. Nevertheless, since each curve has its own advantage and disadvantage, an appropriate curve is selected and set in accordance with the purpose of use.

TABLE 1

| | Type of curve | | | | | | | |
|---|---|---|---|---|---|---|---|---|
| | T0 | T1 | T2 | T3 | T4 | T5 | T6 | T7 |
| Constant acceleration | 0 | 0 | 0.5 | 0.5 | 0.5 | 0.5 | 1 | 1 |
| Harmonic | 0 | 0 | 0 | 0.5 | 0.5 | 1 | 1 | 1 |
| Cycloid | 0 | 0.25 | 0.25 | 0.5 | 0.5 | 0.75 | 0.75 | 1 |
| Modified trapezoid | 0 | 0.125 | 0.375 | 0.5 | 0.5 | 0.625 | 0.875 | 1 |
| Modified sine | 0 | 0.125 | 0.125 | 0.5 | 0.5 | 0.875 | 0.875 | 1 |
| Modified constant velocity | 0 | 0.0625 | 0.0625 | 0.25 | 0.75 | 0.9375 | 0.9375 | 1 |
| Asymmetrical modified trapezoid | 0 | 0.1 | 0.3 | 0.4 | 0.4 | 0.55 | 0.85 | 1 |
| Trapecloid | 0 | 0.125 | A | 0.125 + A | 0.125 + A | 0.25 + A | 0.25 + A | 1 |

TABLE 1-continued

| | Type of curve | | | | | | | |
|---|---|---|---|---|---|---|---|---|
| | T0 | T1 | T2 | T3 | T4 | T5 | T6 | T7 |
| Single-dwell modified trapezoid | 0 | 0.125 | B | 0.125 + B | 0.125 + B | 0.25 + B | 1 | 1 |
| Single-dwell modified sine | 0 | 0.125 | 0.125 | 0.5 | 0.5 | 1 | 1 | 1 |

A = (1.25 + 0.125π)/(2 + π), B = 7/16 − 0.125/π

Moreover, the x-axis-direction track calculation unit 35 is configured to: set a track of the cutter 15 in the machining region (θ1, θ2) on the x-θ coordinates based on the data inputted from the relieving-spindle-system input unit 33 and the rotation-angle allocation unit 34; and to link and combine the track to the track of the cutter 15 in the relieving region set as described above by using cubic interpolation.

When a crowning process is performed in the machining region, a track of the cutter 15 is plotted on the x-θ coordinates, and the track is set in a shape of arc within a range of the face width B, in such a manner as to satisfy a desired crowning shape. The arc is set to have a radius $r_c$ based on the crowning amount $R_1$ and the face width B. Specifically, the radius $r_c$ is calculated according to the following equation (1).

$$r_c = \{(0.5 \cdot B)^2 + R_1^2\}/2 \cdot R_1 \quad (1)$$

Figure 7:
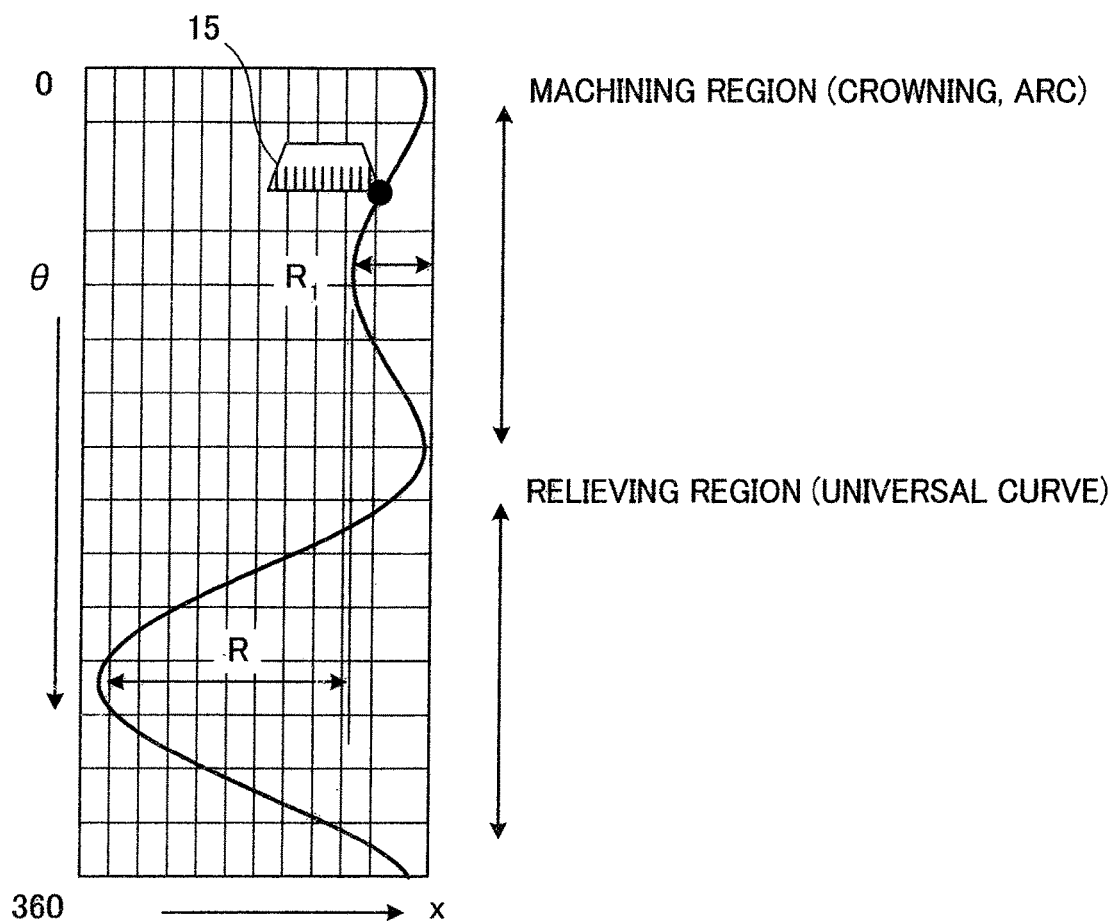
FIG. 7 is a graph for illustrating a track of the cutter performing a crowning process, which is plotted on x-θ coordinates.

When the track of the cutter 15 in the machining region (θ1, θ2) on the x-θ coordinates thus calculated and the above-described track of the cutter 15 in the relieving region are linked and combined together, a curve as shown in FIG. 7 is obtained.

On the other hand, when a tapering process is performed in the machining region, a track of the cutter 15 is plotted on the x-θ coordinates, and the track is set in a shape of oblique straight line within the range of the face width B, in such a manner as to satisfy a desired tapering process or tapering angle.

Figure 8:
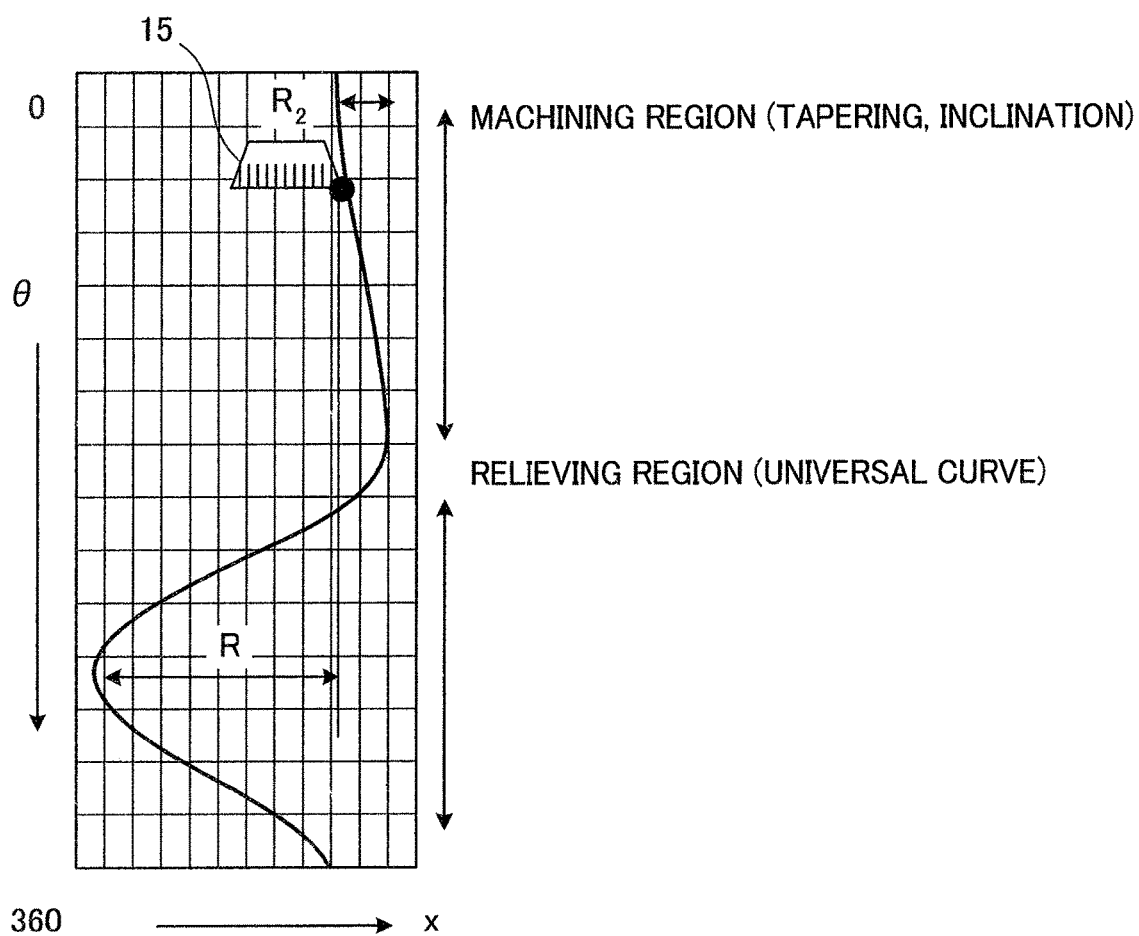
FIG. 8 is a graph for illustrating a track of the cutter performing a tapering process, which is plotted on the x-θ coordinates.

When the track of the cutter 15 in the machining region (θ1, θ2) on the x-θ coordinates thus set and the above-described track of the cutter 15 in the relieving region are linked and combined together, a curve as shown in FIG. 8 is obtained.

The x-axis-direction track calculation unit 35 is then configured to output data on the track of the cutter 15 on the x-θ coordinates obtained as described above to the x-y-coordinates track calculation unit 36.

The x-y-coordinates track calculation unit 36 is configured to: continuously plot the track of the cutter 15 within the rotation angle θ=0 to 360 deg. of the cutter spindle motor 11 on x-y coordinates based on the data inputted from the x-axis-direction track calculation unit 35; determine a track of the cutter 15 on the x-y coordinates, that is, an actual track of the cutter 15; and output data on the track to the cutter-head inclination-angle calculation unit 37.

Figure 9:
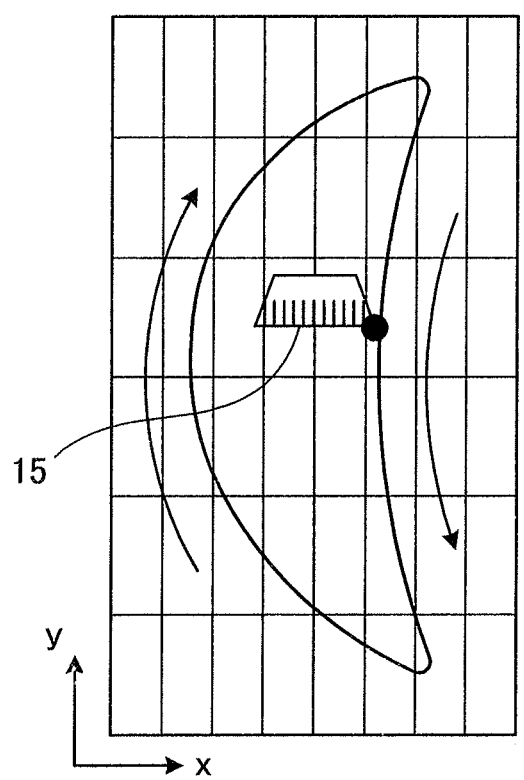
FIG. 9 is a graph in which a track of the cutter performing the crowning process is plotted in x-y coordinates.
Figure 10:
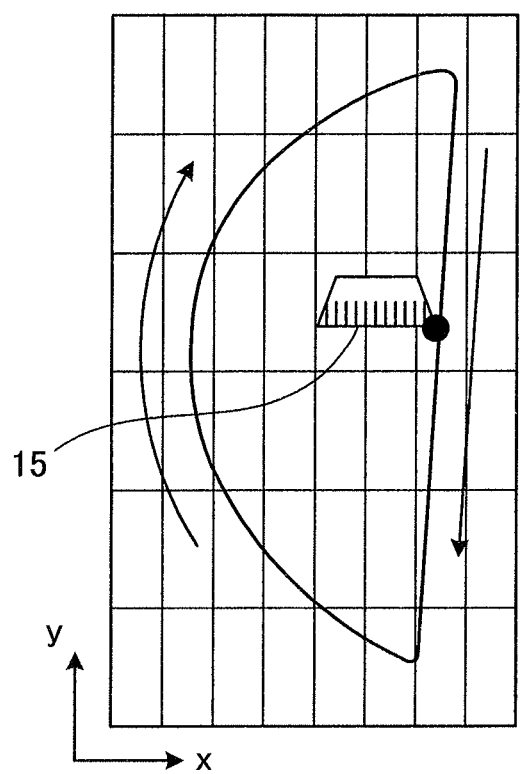
FIG. 10 is a graph in which a track of the cutter performing the tapering process is plotted in the x-y coordinates.

FIG. 9 is a graph in which a track of the cutter performing the crowning process is plotted in the x-y coordinates. FIG. 10 is a graph in which a track of the cutter performing the tapering process is plotted in the x-y coordinates. Note that the arrows in FIGS. 9 and 10 indicate directions in which the cutter moves. For example, within a range of the rotation angle θ=0 to 360 deg., $(x_i, y_i)$ (i=0, . . . , 360) are plotted. The track of the cutter 15 on the x-y coordinates thus created is the actual track of the cutter 15 as shown in FIGS. 9 and 10.

The cutter-head inclination-angle calculation unit 37 is configured to: determine an inclination angle of a cutter head (the illustration is omitted) for each rotation angle θ of the crank arm $13_a$ from $(x_i, y_i)$ of the cutter 15 on the x-y coordinates described above; and output data on the inclination angle $\Delta\Psi_i$ (i=0, . . . , 360) thus determined to the relieving-spindle-motor input-angle command unit 38.

To be more specific, actually, the relieving spindle motor 12 and the four-bar link mechanism 14 cause the cutter 15 to move in the x-axis direction. The cutter head (the illustration is omitted) including the cutter spindle, to which the cutter 15 is attached, is capable of freely swinging (inclining) about a fulcrum $14_a$ as shown in Part (a) of FIG. 1. The output link (the link having the length $L_4$ in Part (a) of FIG. 1) of the four-bar link mechanism 14 and the cutter head has such a relation that the two are always orthogonal to each other. Hence, when the rotation angle of the output link changes in an amount of $\Delta\Psi$, the cutter head also inclines at an angle of $\Delta\Psi$.

Figure 11:
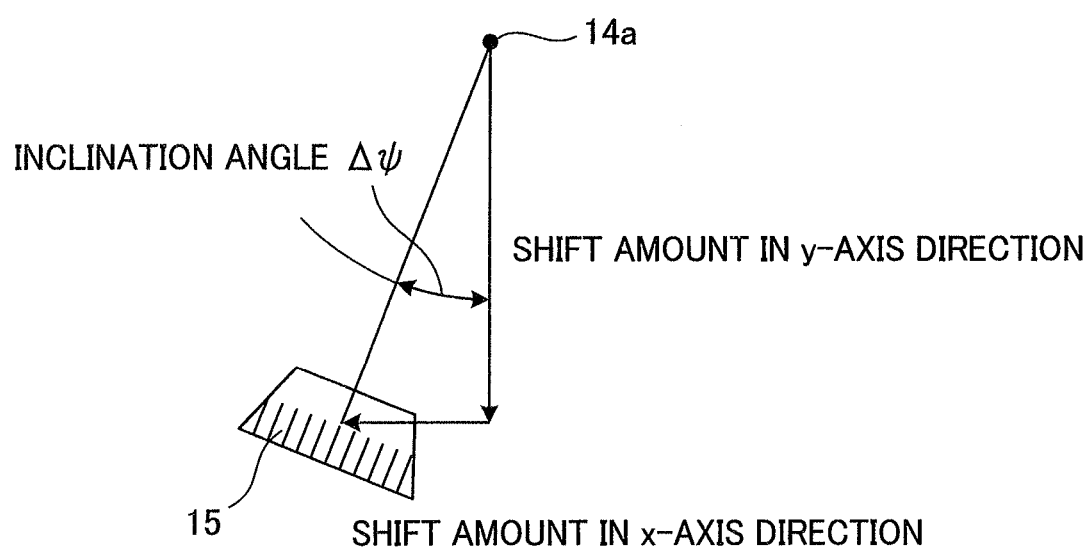
FIG. 11 is a schematic diagram for illustrating a relation among a shift amount in an x-axis direction, a shift amount in a y-axis direction, and an inclination angle ΔΨ.

FIG. 11 is a schematic diagram for illustrating a relation among the shift amount in the x-axis direction, the shift amount in y-axis direction, and the inclination angle $\Delta\Psi$. As shown in this figure, the inclination angle of the cutter head can be calculated according to the following equation (2).

$$\Delta\Psi = f(\theta) = \tan^{-1}(x \div y) \quad (2)$$

Note that since the inclination angle of the cutter head is equal to the inclination angle of the cutter 15, the cutter-head inclination-angle calculation unit 37 may be configured to determine the inclination angle of the cutter 15 as described above in place of the cutter head.

The relieving-spindle-motor input-angle command unit 38 is configured to: determine an output angle Ψ of the four-bar link mechanism 14 from the inclination angle $\Delta\Psi$ of the cutter head based on the data inputted from the cutter-head inclination-angle calculation unit 37; and inversely calculate an input angle δ from the output angle Ψ (see Part (a) of FIG. 1).

The output angle Ψ of the four-bar link mechanism 14 can be calculated according to the following equation (3).

$$\Psi = \Psi_0 - \Delta\Psi \quad (3)$$

Figure 12:
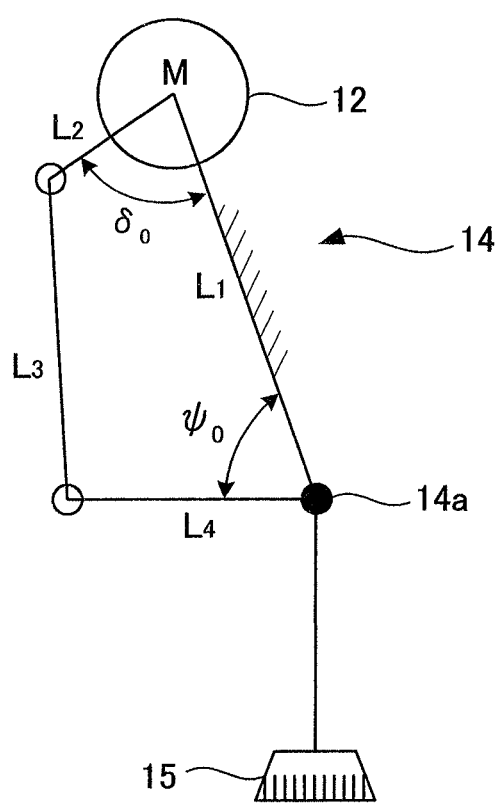
FIG. 12 is a schematic view for illustrating reference position of a four-bar link mechanism.
Figure 13:
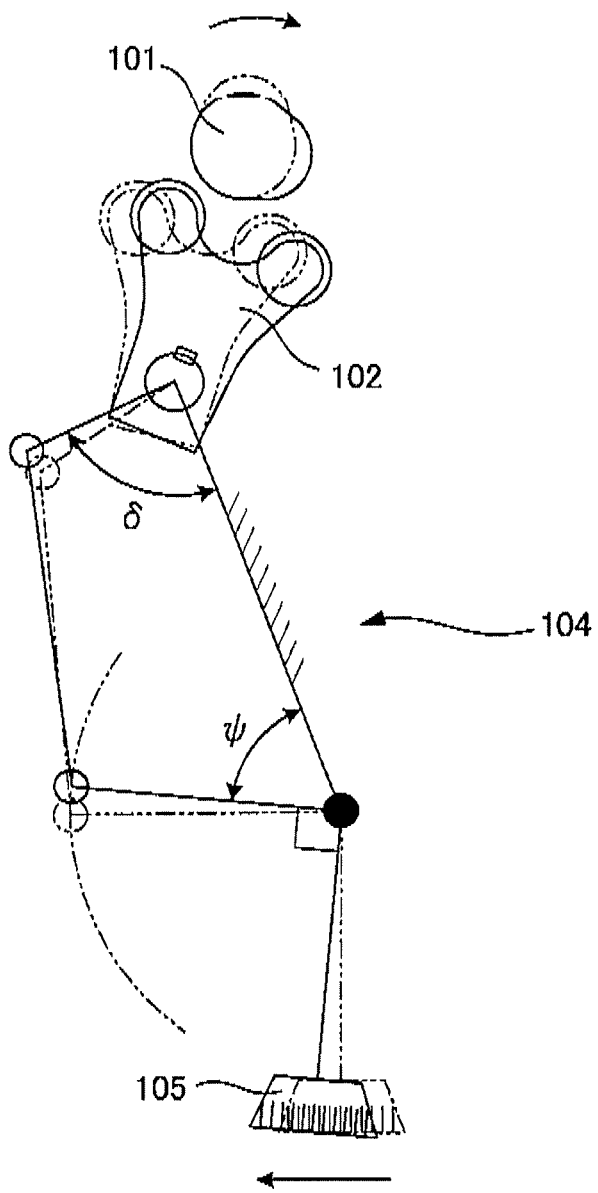
FIG. 13 is a schematic view for explaining a cam mechanism of a conventional gear cutting machine.

FIG. 12 is a schematic view for illustrating a reference position of the four-bar link mechanism 14. When the reference position is set with the inclination angle of the cutter 15 (the inclination angle of the cutter head) being zero as shown in this figure, the $\Psi_0$ represents the output angle (initial output angle) at the reference position. Note that the initial output angle $\Psi_0$ can be geometrically determined from a positional relation regarding where the relieving spindle motor 12 is attached relative to the fulcrum $14_a$, and the lengths $L_1$, $L_2$, $L_3$, and $L_4$ of the links.

The output angle Ψ of the four-bar link mechanism 14 is a function of the input angle δ and the lengths $L_1$, $L_2$, $L_3$, and $L_4$ of the links. Hence, $\Psi_i = f(\delta_i, L_1, L_2, L_3, L_4)$ (i=0, . . . , 360) is obtained. Then, an inverse function of this equation is solved for the input angle $\delta_i$. Hence, $\delta_i = f^{-1}(\Psi_i, L_1, L_2, L_3, L_4)$ (i=0, . . . , 360) is obtained.

Here, values of $L_1$ to $L_4$, which are machine-specific constants, are inputted from the relieving-spindle-system input unit 33. Meanwhile, since the rotation angle θ of the crank arm 13$_a$ determines a value of the output angle $\Psi_i$, the above-described $\delta_i = f^{-1} (\Psi_i, L_1, L_2, L_3, L_4)$ (i=0, . . . , 360) can be converted to $\delta(\theta) = f^{-1} (\Psi(\theta))$. According to this equation, the input angle δ of the four-bar link mechanism 14 is calculated for each rotation angle θ of the crank arm 13$_a$ (the cutter spindle motor 11).

Moreover, the relieving-spindle-motor input-angle command unit 38 is configured to output a command value $U_i$ to the relieving spindle motor 12. This command value $U_i$ is calculated from the following equation (4).

$$U_i = \Delta\delta(\theta) = \delta(\theta) - \delta_0 (i=0, \ldots, 360) \quad (4)$$

Here, the $\delta_0$ represents an input angle (initial input angle) at the reference position shown in FIG. 12. Note that the initial input angle $\delta_0$ can be geometrically determined from the positional relation regarding where the relieving spindle motor 12 is attached relative to the fulcrum 14$_a$, and the lengths $L_1$, $L_2$, $L_3$, and $L_4$ of the links.

To be more specific, the amount $\Delta\delta_i$ of change in the rotation angle of the input link is the command value $U_i$ to the relieving spindle motor 12.

Figure 3:
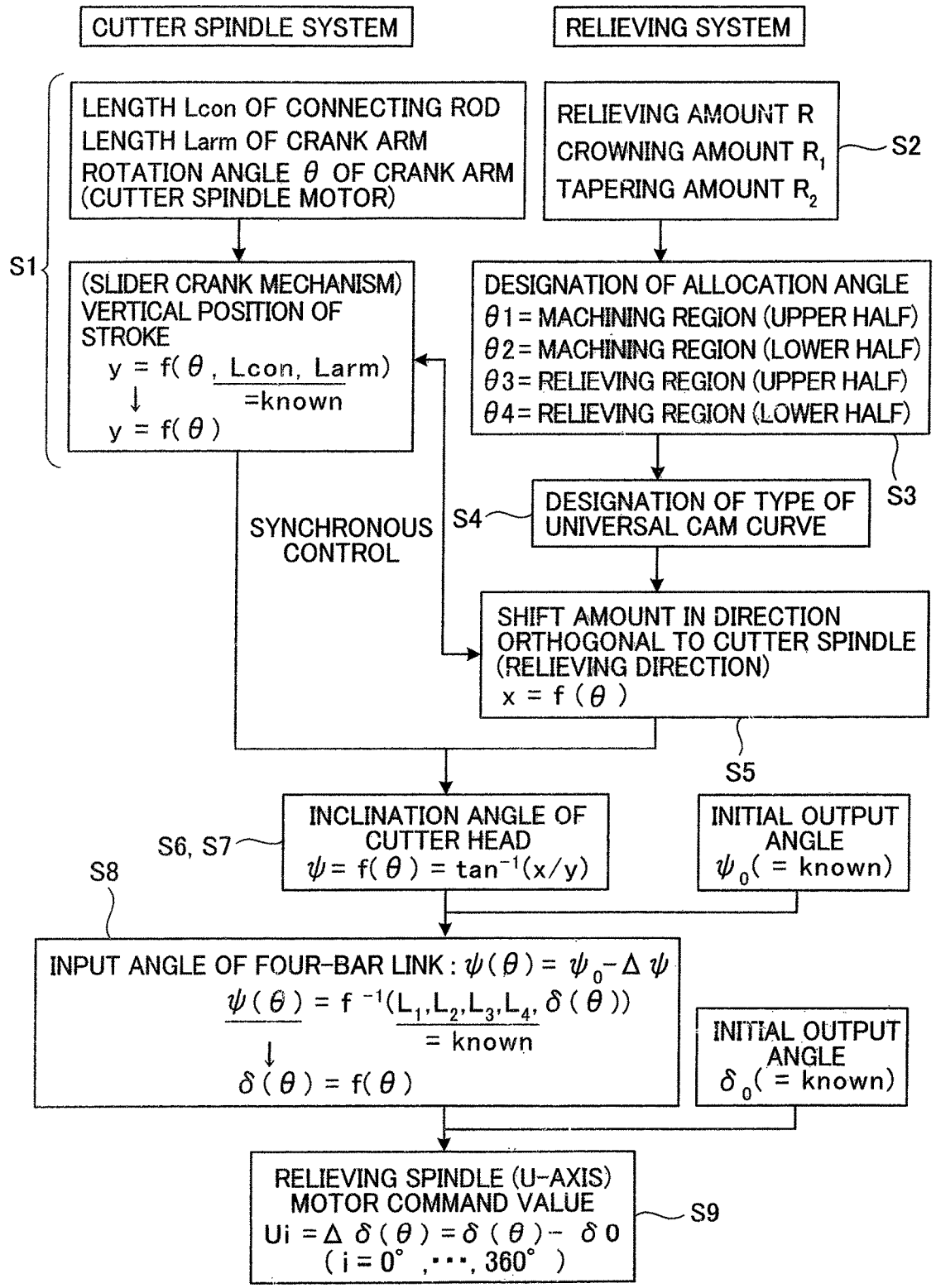
FIG. 3 is a flowchart for explaining an operation of the motor control unit.

The configuration of the motor control unit 10 has been described. Hereinbelow, an operation of the motor control unit 10 will be described using a flowchart in FIG. 3.

In step S1, the position of the cutter 15 in the y-axis direction is determined from: the rotation angle of the crank arm 13$_a$, that is, the rotation angle θ (θ=0 to 360 deg.) of the cutter spindle motor 11, the length $L_{arm}$ of the crank arm 13$_a$, and the length $L_{con}$ of the connecting rod 13$_b$. The cutter-spindle-system set unit 31 sets the values of $L_{arm}$ and $L_{con}$, and thereby the y-axis-direction track calculation unit 32 can determine the track of the cutter 15 on the y-θ coordinates as indicated by the solid line in FIG. 4 according to y=f(θ) from y=f (θ, $L_{arm}$, $L_{con}$). In this step S1, the motor control unit 10 controls the cutter spindle motor 11.

In step S2, the relieving-spindle-system input unit 33 sets the relieving amount R, the crowning amount $R_1$, and the tapering amount $R_2$ in accordance with the shape of the gear 21 to be cut.

In step S3, the rotation-angle allocation unit 34 sets the correspondences of the rotation angle θ of the cutter spindle motor 11 in the single rotation with the machining region and the relieving region. As shown in FIG. 5, the machining region is divided into two sub-zones to obtain θ1 and θ2 as the sub-zones of the rotation angle θ respectively corresponding to the two. Similarly, the relieving region is divided into two sub-zones to obtain θ3 and θ4 as the sub-zones of the rotation angle θ respectively corresponding to the two. In the present embodiment, θ1 is θ=30 to 90 deg., θ2 is θ=90 to 150 deg., θ4 is θ=150 to 270 deg., and θ3 is θ=270 to 30 deg.

In step S4, the x-axis-direction track calculation unit 35 performs setting such that the track of the cutter 15 in the relieving region (θ3, θ4) on the x-θ coordinates forms a universal cam curve.

In step S5, the x-axis-direction track calculation unit 35 sets the track of the cutter 15 in the machining region (θ1, θ2) on the x-θ coordinates, and links and combines the track to the track of the cutter 15 in the relieving region set in step S4 by using cubic interpolation. When a crowning process is performed, a curve as shown in FIG. 7 is obtained. When a tapering process is performed, a curve as shown in FIG. 8 is obtained.

Through steps S2 to 5 above, shifts of the cutter 15 in the x-axis direction in the machining region and the relieving region can be defined as a function of θ by x=f(θ).

In step S6, the x-y-coordinates track calculation unit 36 continuously plots the track of the cutter 15, defined through steps S1 to 5, within the rotation angle θ=0 to 360 deg. of the cutter spindle motor 11 on the x-y coordinates, and determines the actual track of the cutter 15. For example, by plotting ($x_i$, $y_i$) (i=0, . . . , 360) for each rotation angle θ within the range of the rotation angle θ=0 to 360 deg., the actual track of the cutter 15 as shown in FIGS. 9 and 10 is obtained.

In step S7, the cutter-head inclination-angle calculation unit 37 determines the inclination angle of the cutter head, that is, the output angle $\Delta\Psi_i$ (i=0, . . . , 360) of the four-bar link mechanism 14, for each rotation angle θ of the crank arm 13$_a$ from ($x_i$, $y_i$) of the cutter 15 on the x-y coordinates obtained in step S6 using the equation (2).

In step S8, the output angle Ψ of the four-bar link mechanism 14 is determined from the inclination angle ΔΨ of the cutter head, and the input angle δ (see Part (a) of FIG. 1) is inversely calculated from the output angle Ψ.

To be more specific, the relieving-spindle-motor input-angle command unit 38, first, geometrically determines the initial output angle $\Psi_0$ from the positional relation regarding where the relieving spindle motor 12 is attached relative to the fulcrum 14$_a$, and the lengths $L_1$, $L_2$, $L_3$, and $L_4$ of the links, and next determines the output angle Ψ according to the equation (3). Further, the relieving-spindle-motor input-angle command unit 38 solves the inverse function of the equation $\Psi_i = f (\delta_i, L_1, L_2, L_3, L_4)$ for the input angle $\delta_i$. Hence, $\delta_i = f^{-1} (\Psi_i, L_1, L_2, L_3, L_4)$ is obtained.

Here, the relieving-spindle-motor input-angle command unit 38 is configured to receive values of $L_1$ to $L_4$, which are machine-specific constants, from the relieving-spindle-system input unit 33. The values of $L_1$ to $L_4$ are inputted from the relieving-spindle-system input unit 33. Meanwhile, since the rotation angle θ of the crank arm 13$_a$ (the cutter spindle motor 11) determines the value of the output angle $\Psi_i$, $\delta(\theta) = f^{-1}(\Psi(\theta))$ is obtained. According to this equation, the input angle δ of the four-bar link mechanism 14 is calculated for each rotation angle θ of the crank arm 13$_a$ (the cutter spindle motor 11). The above is step S8.

In step S9, the relieving-spindle-motor input-angle command unit 38 geometrically determines the initial output angle $\delta_0$ from the positional relation regarding where the relieving spindle motor 12 is attached relative to the fulcrum 14$_a$, and the lengths $L_1$, $L_2$, $L_3$, and $L_4$ of the links. Next, the relieving-spindle-motor input-angle command unit 38 calculates the command value $U_i$ from the equation (4), and further outputs the command value $U_i$ to the relieving spindle motor 12.

Through steps S1 to 9 above, the motor control unit 10 is capable of executing an appropriate command to the relieving spindle motor 12.

Hereinabove, the gear cutting machine according to Embodiment 1 of the present invention has been described. In other words, the present machine is a gear cutting machine including: the cutter 15; the cutter spindle motor 10 configured to cause, via the crank mechanism 13 and the cutter spindle 16, the cutter 15 to perform a stroke operation in the direction of the cutter spindle; and the motor control unit 10 configured to control the rotation angle of the cutter spindle motor 10. The gear cutting machine includes the relieving spindle motor 12 configured to cause the cutter 15 to move in the direction of the relieving spindle via the link mechanism (the four-bar link mechanism 14). The motor control unit 10 controls the rotation angle of the relieving spindle motor 12 based on the rotation angle of the cutter spindle motor 11.

Moreover, in the present machine, the motor control unit 10 determines the track of the cutter 15 on the x-y coordinates from the tracks of the cutter 15 on the x-θ coordinates and on the y-θ coordinates, where θ is the rotation angle of the cutter spindle motor 11, the y-axis direction is the direction of the cutter spindle, and the x-axis direction is the direction of the relieving spindle, determines the inclination angle $\Delta\Psi$ of the cutter 15 from the track of the cutter 15 on the x-y coordinates, determines the output angle $\Psi$ of the link mechanism from the inclination angle $\Delta\Psi$, and determines the input angle $\delta$ of the link mechanism from the output angle $\Psi$ of the link mechanism, so that the motor control unit 10 controls the rotation angle of the relieving spindle motor 12.

Further, in the present machine, the motor control unit 10 may perform control such that the track of the cutter 15 in the relieving region on the x-θ coordinates forms a universal cam curve.

Furthermore, in the present machine, the motor control unit 10 may divide into two sub-zones each of the zone of the machining region and the zone of the relieving region within the rotation angle θ, and control the track of the cutter 15 in each of the divided sub-zones on the x-θ coordinates.

With the above configurations, the present machine makes it possible to accurately control a relieving operation in accordance with a desired shape of a gear to be cut. Thus, the relieving operation can be performed suitably in a crowning process and a tapering process, and is also applicable to internal gear cutting.

INDUSTRIAL APPLICABILITY

The present invention is preferable as a gear cutting machine.

REFERENCE SIGNS LIST

10 motor control unit
11 cutter spindle motor
12 relieving spindle motor
13,103 crank mechanism
13$_a$ crank arm
13$_b$ connecting rod
14,104 four-bar link mechanism
14$_a$ fulcrum
15, 105 cutter
16 cutter spindle
21 gear to be cut
31 cutter-spindle-system set unit
32 y-axis-direction track calculation unit
33 relieving-spindle-system input unit
34 rotation-angle allocation unit
35 x-axis-direction track calculation unit
36 x-y-coordinates track calculation unit
37 cutter-head inclination-angle calculation unit
38 relieving-spindle-motor input-angle command unit
39 input-angle command unit
101 cam
102 cam lever

The invention claimed is:

1. A gear cutting machine comprising:

a cutter;

a cutter spindle motor configured to cause, via a crank mechanism and a cutter spindle, the cutter to perform a stroke operation in a direction of the cutter spindle; and a motor control unit configured to control a rotation angle of the cutter spindle motor, wherein the gear cutting machine comprises a relieving spindle motor configured to cause the cutter to move in a direction of a relieving spindle via a link mechanism, the motor control unit controls a rotation angle of the relieving spindle motor based on the rotation angle of the cutter spindle motor, and the motor control unit determines a track of the cutter on x-y coordinates from tracks of the cutter on x-θcoordinates and on y-θcoordinates, where θis the rotation angle of the cutter spindle motor, the y-axis direction is the direction of the cutter spindle, and the x-axis direction is the direction of the relieving spindle, determines an inclination angle of the cutter from the track of the cutter on the x-y coordinates, determines an output angle of the link mechanism from the inclination angle, and determines an input angle of the link mechanism from the output angle, so that the motor control unit controls the rotation angle of the relieving spindle motor.

2. The gear cutting machine according to claim 1, wherein the motor control unit performs control such that the track of the cutter in a relieving region on the x-θcoordinates forms a universal cam curve.

3. The gear cutting machine according to claim 2, wherein the motor control unit divides into two sub-zones each of a zone of a machining region and a zone of the relieving region within the θ, and controls the track of the cutter in each of the divided sub-zones on the x-θcoordinates.

4. The gear cutting machine according to claim 1, wherein the motor control unit receives each data on a relieving amount, a crowning amount, and a tapering amount in the x-axis direction in accordance with a shape of a gear to be cut, and determines the track of the cutter on the x-θcoordinates based on the inputted data.

5. The gear cutting machine according to claim 4, wherein the motor control unit sets the track of the cutter in a machining region on the x-θcoordinates based on any one of the crowning amount and the tapering amount, sets the track of the cutter in a relieving region on the x-θcoordinates such that the track of the cutter forms a universal cam curve based on the relieving amount, and links and combines the track of the cutter in the machining region on the x-θcoordinates to the track of the cutter in the relieving region on the x-θcoordinates by using cubic interpolation.

6. The gear cutting machine according to claim 5, wherein the motor control unit divides into two sub-zones each of a zone of the machining region and a zone of the relieving region within the θ, and controls the track of the cutter in each of the divided sub-zones on the x-θcoordinates.

* * * * *